(12) United States Patent
Khalid et al.

(10) Patent No.: US 12,006,063 B2
(45) Date of Patent: Jun. 11, 2024

(54) AERIAL-BASED EVENT NOTIFICATION

(71) Applicant: GM GLOBAL TECHNOLOGY OPERATIONS LLC, Detroit, MI (US)

(72) Inventors: Umer Khalid, Farmington Hills, MI (US); Ningsheng Qiao, Troy, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 17/849,972

(22) Filed: Jun. 27, 2022

(65) Prior Publication Data

US 2023/0415912 A1    Dec. 28, 2023

(51) Int. Cl.
| | |
|---|---|
| *B64D 45/00* | (2006.01) |
| *B64C 39/02* | (2023.01) |
| *G08G 1/16* | (2006.01) |
| *B64U 80/86* | (2023.01) |
| *B64U 101/20* | (2023.01) |
| *H04W 4/40* | (2018.01) |

(52) U.S. Cl.
CPC ............ *B64D 45/00* (2013.01); *B64C 39/024* (2013.01); *G08G 1/16* (2013.01); *B64U 80/86* (2023.01); *B64U 2101/20* (2023.01); *H04W 4/40* (2018.02)

(58) Field of Classification Search
CPC ..... B64D 45/00; B64C 39/022; B64C 39/024; G08G 1/16; H04W 4/40; B64U 80/86; B64U 2101/20
See application file for complete search history.

(56) References Cited

U.S. PATENT DOCUMENTS

| 10,812,960 | B2 * | 10/2020 | Weinfield | ................ H04W 4/90 |
| 11,579,633 | B1 * | 2/2023 | Haslam | .................... G05D 1/12 |
| 2017/0086048 | A1 * | 3/2017 | Cho | ........................ G01S 19/13 |
| 2018/0319494 | A1 * | 11/2018 | Aflatoon | ................ B60L 53/80 |
| 2020/0033846 | A1 * | 1/2020 | Buyse | ................. G05D 1/0022 |
| 2020/0102093 | A1 * | 4/2020 | Claridge | .................... B64F 1/04 |
| 2020/0148348 | A1 * | 5/2020 | Bradley | .................... B64F 3/02 |
| 2020/0174469 | A1 * | 6/2020 | Trumpore | ............. B64U 80/86 |
| 2020/0216196 | A1 * | 7/2020 | Sohmshetty | .......... B64U 10/60 |
| 2020/0218287 | A1 * | 7/2020 | Wang | ..................... G05D 1/104 |
| 2020/0231279 | A1 * | 7/2020 | Buyse | .................... B64U 10/60 |
| 2020/0385116 | A1 * | 12/2020 | Sabripour | ............ G08G 5/0078 |
| 2021/0047030 | A1 * | 2/2021 | Corey | ................... B64U 80/86 |

(Continued)

*Primary Examiner* — Benjamin P Lee
(74) *Attorney, Agent, or Firm* — Quinn IP Law

(57) ABSTRACT

A method for aerial-based event notification includes detecting a trigger event with one or more electronic units of a system. The system includes a telematics unit, a drone having one or more notification actuators, and a tether that connects the drone to the system. The method further includes launching the drone with the telematics unit in response to the trigger event, waiting a predetermined time after the trigger event, retracting the drone in response to a subsequent event being undetected within the predetermined time after the trigger event, detecting the subsequent event with the one or more electronic units, placing the drone in an alert configuration in response to detecting the subsequent event within the predetermined time after the trigger event, and generating one or more alert notifications from the one or more notification actuators while the drone is in the alert configuration.

20 Claims, 7 Drawing Sheets

(56) References Cited

U.S. PATENT DOCUMENTS

| | | | |
|---|---|---|---|
| 2021/0129982 A1* | 5/2021 | Collins | G05D 1/0684 |
| 2021/0365692 A1* | 11/2021 | Hashiguchi | B60R 11/04 |
| 2022/0034633 A1* | 2/2022 | Yeshurun | G06N 20/00 |
| 2022/0144166 A1* | 5/2022 | Hamm | E01F 9/70 |
| 2022/0355840 A1* | 11/2022 | Tenne | H04W 4/42 |
| 2023/0202682 A1* | 6/2023 | Kiyokami | B64U 70/90 |
| | | | 244/114 R |

* cited by examiner

AERIAL-BASED EVENT NOTIFICATION

INTRODUCTION

The present disclosure relates to a system and a method for aerial-based event notification.

Vehicles experiencing problematic events along a road may present issues to other vehicles approaching from behind that create traffic congestions. Low visibility conditions may make it difficult for the other vehicles to recognize and react to the events. In remote areas, and at certain times of the day where other vehicles are scarce, the vehicles experiencing the problems sometimes have difficulty in obtaining aid.

Accordingly, those skilled in the art continue with research and development efforts in the field of generating aerial-based notifications to warn approaching vehicles and seeking remote assistance.

SUMMARY

A method for aerial-based event notification is provided herein. The method includes detecting a trigger event with one or more electronic units of a system. The system includes a telematics unit, a drone having one or more notification actuators, and a tether that connects the drone to the system. The method further includes launching the drone with the telematics unit in response to the trigger event, waiting a predetermined time after the trigger event, retracting the drone in response to a subsequent event being undetected within the predetermined time after the trigger event, detecting the subsequent event with the one or more electronic units, placing the drone in an alert configuration in response to detecting the subsequent event within the predetermined time after the trigger event, and generating one or more alert notifications from the one or more notification actuators while the drone is in the alert configuration.

In one or more embodiments, the method further includes recording an initial time of the trigger event, recording an initial location of the system in response to the trigger event, recording a current location of the system in response to the subsequent event, transferring the initial time, the initial location and the current location to the drone, and flying the drone to the initial location, wherein the one or more alert notifications are generated at the initial location.

In one or more embodiments, the method further includes requesting an assistance via a cellular network with the telematics unit in response to the detecting of the subsequent event within the predetermined time after the trigger event, seeking a connection on the cellular network with the drone in response to the telematics unit being unable to connect to the cellular network, and transmitting from the drone via the cellular network one or more of the current location of the system, a picture of a scene around the system taken by the drone hovering above the current location, and the initial time of the trigger event in response to the connection being established by the drone.

In one or more embodiments, the method further includes releasing the drone from the tether in response to the drone being unable to connect to the cellular network, increasing a height of the drone, and re-seeking the connection on the cellular network.

In one or more embodiments, the method further includes determining a calculated direction to find the assistance with the telematics unit based on one or more maps of a plurality of cellular towers proximate the current location and a plurality of towns proximate the current location, transferring the calculated direction to the drone, releasing the drone from the tether, and flying the drone in the calculated direction.

In one or more embodiments, the method further includes seeking a connection on the cellular network with the drone while flying an approximately straight path in the calculated direction, and transmitting from the drone via the cellular network one or more of the current location of the system, a picture of a scene around the system taken by the drone hovering above the current location, and an initial time of the trigger event in response to the connection being established by the drone.

In one or more embodiments, the method further includes flying the drone along a road running in approximately the calculated direction, seeking an assistance vehicle on the road with the drone, and displaying one or more of a visual notification and an audio notification from the drone to the assistance vehicle in response to the drone finding the assistance vehicle.

In one or more embodiments, the method further includes receiving at the drone an acknowledgement from the assistance vehicle that at least one of the visual notification and the audio notification was received, and flying the drone along the road back to the current location in response to the acknowledgement.

In one or more embodiments, the method further includes requesting an assistance via a cellular network with the telematics unit in response to the deploying of the drone, limiting a horizontal range of the drone from the system with the tether, and releasing the drone from the tether in response to the initial location being further than the horizontal range and the telematics unit being unable to connect to the cellular network.

In one or more embodiments, the method further includes receiving a manual direction from a user control, transferring the manual direction to the drone, and flying the drone in the manual direction.

In one or more embodiments, the method further includes measuring an acceleration of the system, and asserting the trigger event in response to the acceleration exceeding a threshold acceleration value.

In one or more embodiments, the method further includes measuring a roll-over index of the system, and asserting the trigger event in response to the roll-over index exceeding a threshold index value.

In one or more embodiments, the method further includes monitoring a plurality of brakes of the system, and asserting the trigger event in response to one or more of the plurality of brakes indicating a slippage.

In one or more embodiments, the method further includes measuring a temperature of a battery, asserting the trigger event in response to the temperature exceeding a threshold temperature value, and asserting the subsequent event in response to the temperature indicating a thermal runaway condition in the battery.

In one or more embodiments, the method further includes asserting the trigger event in response to a theft alarm being triggered, and asserting the subsequent event in response to the theft alarm remaining triggered during the predetermined time.

A system is provided herein. The system includes a drone, one or more electronic units, and a telematics unit. The drone has one or more notification actuators. The one or more electronic units is configured to detect a trigger event and a subsequent event in the system. The telematics unit is in communication with the one or more electronic units and the drone. The telematics unit is configured to launch the drone in response to the trigger event, wait a predetermined time after the trigger event, retract the drone in response to the subsequent event being undetected within the predetermined time after the trigger event, and place the drone in an alert configuration in response to detecting the subsequent event within the predetermined time after the trigger event. The drone is configured to generate one or more alert notifications from the one or more notification actuators while the drone is in the alert configuration.

In one or more embodiments of the system, the one or more electronic units includes a stability control unit, an anti-lock braking system, a battery temperature monitor, a theft alarm, an airbag controller, and a supplemental restraint system.

In one or more embodiments of the system, the one or more alert notifications is one or more of a visual notification, an audio notification and a digital notification, and the digital notification occurs via a cellular network.

A vehicle is provided herein. The vehicle includes a drone, a storage member, one or more electronics units, and a telematics unit. The drone has one or more notification actuators. The storage member is configured to carry, deploy, and recover the drone. The one or more electronic units is configured to detect a trigger event and a subsequent event in the vehicle. The telematics unit is in communication with the one or more electronic units, the drone, and the storage member. The telematics unit is configured to launch the drone in response to the trigger event, wait a predetermined time after the trigger event, retract the drone in response to the subsequent event being undetected within the predetermined time after the trigger event, and place the drone in an alert configuration in response to detecting the subsequent event within the predetermined time after the trigger event. The drone is configured to generate one or more alert notifications from the one or more notification actuators while the drone is in the alert configuration.

In one or more embodiments, the vehicle includes an airbag controller configured to assert the subsequent event in response to deployment of one or more airbags.

The above features and advantages and other features and advantages of the present disclosure are readily apparent from the following detailed description of the best modes for carrying out the disclosure when taken in connection with the accompanying drawings.

DETAILED DESCRIPTION

One or more embodiments of the disclosure provide system and/or method for an aerial-based alert notifications that inform others that an event has happened in the local vicinity. The system/method may be applied to a vehicle that is travelling or stationary at an initial location on the ground when the event occurs. A drone is automatically launched from the vehicle involved in the event. Where the vehicle moves away from the initial location before coming to a stop, the drone may fly back to the initial location where the event occurred and present one or more alert notifications from up in the air to inform other vehicles approaching the location to be cautious.

In various embodiments, the drone may be sent away from the vehicle to search for assistance. In some modes, the vehicle may calculate a direction to a nearest town and/or cellular tower then send the drone in the straight-line in the calculated direction. In other modes, the vehicle may instruct the drone to follow a roadway that the vehicle was on in the calculated direction. In still other modes, a flight of the drone may be manually controlled from a person in the vehicle. If the drone finds a cellular network signal, the drone may place a call for help on the cellular network. If the drone finds another vehicle that appears to be able to render assistance, the drone may signal the assistance vehicle. If the assistance vehicle responds to the signal from the drone, the drone leads the assistance vehicle back to a current location of the vehicle.

Figure 1:
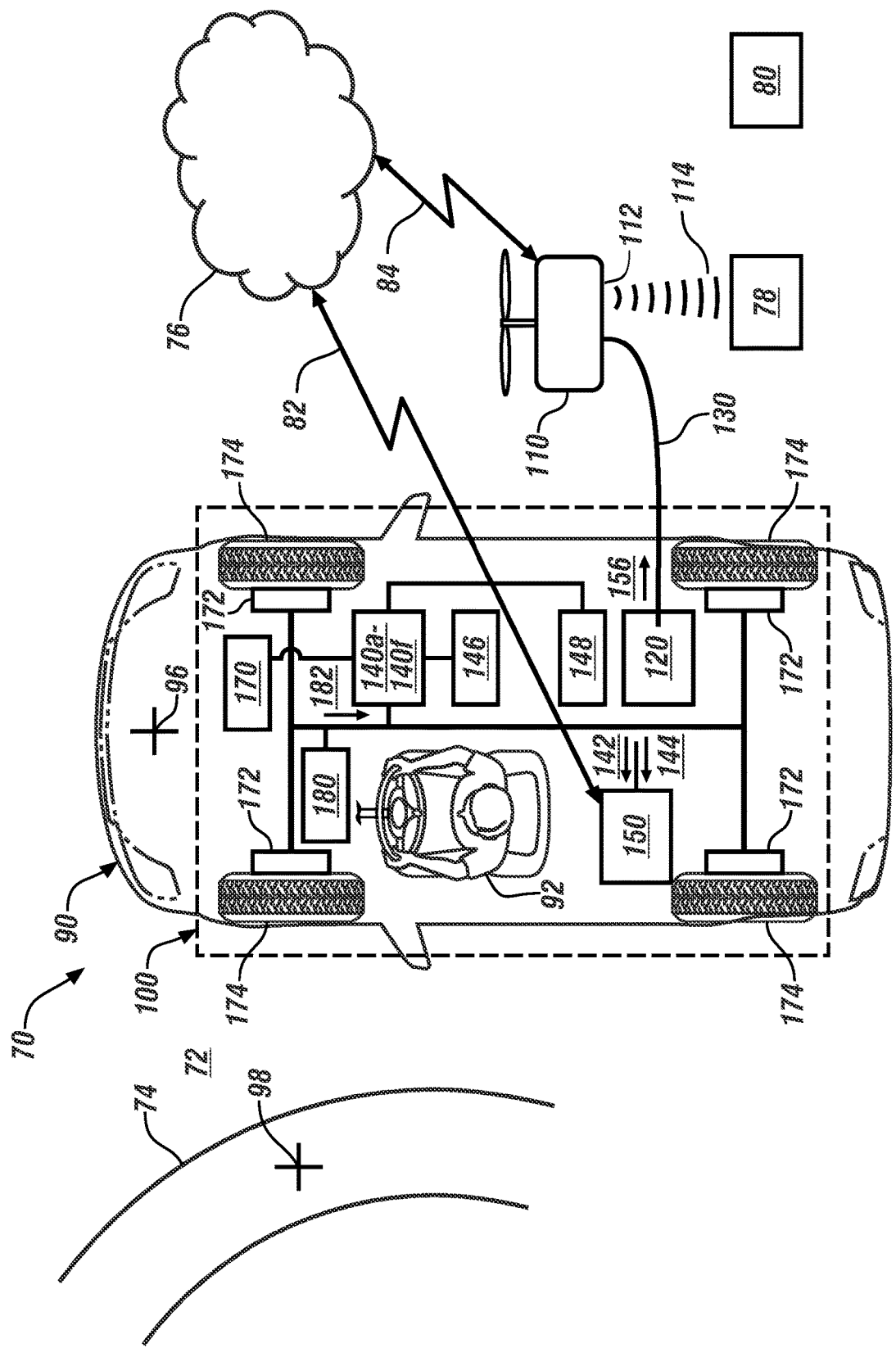
FIG. 1 is a schematic plan diagram of a context of an environment around a vehicle in accordance with one or more exemplary embodiments

Referring to FIG. 1, a schematic plan diagram of an example context of an environment 70 around a vehicle 90 is shown in accordance with one or more exemplary embodiments. The environment 70 may include the ground 72, an optional roadway 74, a cellular network 76, one or more assistors (one shown) 78 and one or more potential assistance vehicles 80 (one shown). The vehicle 90 resides on the ground 72 (as illustrated) or on the roadway 74 at a current location 96 and, where present, may initially be on the roadway 74. The vehicle 90 carries a drone 110 that may be deployed and retrieved as appropriate. Where the cellular network 76 is present at the current location 96 of the vehicle 90, the vehicle 90 may exchange vehicle cellular data 82 bidirectionally with the cellular network 76. Likewise, the drone 110 may exchange drone cellular data 84 bidirectionally with the cellular network 76.

The assistors 78 may be local police, search and rescue organizations, Good Samaritan, OnStar, and/or other data centers that may be able to offer assistance to the vehicle 90. The potential assistance vehicles 80 may include, but are not limited to, police vehicles, fire trucks, paramedic vehicles, tow trucks, ambulances, vehicles with roof-mounted flashing lights, and the like.

The vehicle 90 is designed to carry a driver 92 and one or more passengers (not shown). The vehicle 90 includes a system 100. The system 100 includes the drone 110, a storage system 120, a tether 130, multiple electronic units 140a-140f, one or more airbags 146, a supplemental restraint system 148, a telematics unit 150, a communication bus 160, a battery 170, multiple brakes 172, multiple wheels 174, and user controls 180.

The vehicle cellular data 82 may be exchanged between the telematics cellular network node 152 and the cellular network 76. The vehicle cellular data 82 may include, but is not limited to, the current location 96 of the vehicle 90, the initial location 98 of the trigger event, the initial time of the trigger event, 360 degree camera data recorded by the vehicle 90 at the initial time, and camera data recoded inside the vehicle 90 at the initial time. Other data may be exchanged between the vehicle 90 and the cellular network 76 to meet a design criteria of a particular application.

The drone cellular data 84 may be exchanged between the drone 110 and the cellular network 76. The drone cellular data 84 may include, but is not limited to, the current location 96 of the vehicle 90, the initial location 98 of the trigger event, the initial time of the trigger event, and a picture of a scene around the system taken by the drone hovering above the current location. Other data may be exchanged between the drone 110 and the cellular network 76 to meet a design criteria of a particular application.

One or more alert notifications 114 may be generated and presented by one or more notification actuators 112 of the drone 110 while deployed and in an alert configuration. The alert notifications 114 generally include, but are not limited to, visual notifications, audio notifications, and digital notifications. The visual notification and the audio notifications are presented into the environment 70 around the drone 110. The digital notifications may be conveyed to the cellular network 76 as part of the drone cellular data 84.

A signal carrying information for a trigger event 142 may be generated by one or more of the electronic units 140a-140f and transferred to the telematics unit 150 via the communication bus 160. The trigger event 142 generally notifies the telematics unit 150 that the vehicle 90 has experienced a first event at an initial location 98 that other vehicles in the area should know about.

A signal conveying information for a subsequent event 144 may be generated by one or more of the electronic units 140a-140f and transferred to the telematics unit 150 via the communication bus 160. The subsequent event 144 generally notifies the telematics unit 150 that the vehicle 90 has experienced a second event of a nature that justifies bringing the vehicle 90 to a stop, if moving, and obtaining assistance. The vehicle 90 may stop at the current location 96. In some situations, the initial location 98 and the current location 96 may be the same. In other situations, the initial location 98 may be different than the current location 96. For example, the initial location 98 may be a location on the roadway 74 where the vehicle 90 encountered ice. The current location 96 may be another location on the ground 72 where the vehicle 90 slide off the roadway 74 due to the ice.

A signal carrying information for manual control 182 of the drone may be generated by the user control 180 and transferred to the telematics unit 150 via the bus 160. The manual control 182 generally conveys data from a user (e.g., the driver 92) to manually control a flight of the drone 110.

A signal carrying drone commands 156 may be generated by the telematics unit 150 and transferred to the drone 110 via the vehicle transceiver 154. The drone commands 156 include instructions of where to fly, how high to fly, and routines to perform while in flight.

The vehicle 90 implements a gas-powered vehicle, an electric vehicle, a hybrid vehicle, or a plug-in hybrid vehicle. In various embodiments, the vehicle 90 may include, but is not limited to, a passenger vehicle, a truck, an autonomous vehicle, a motorcycle, a boat, and/or an aircraft. Other types of vehicles 90 may be implemented to meet the design criteria of a particular application.

The system 100 implements an arial-based event notification system. The system 100 is operational to detecting the trigger event 142 with one or more of the electronic units 140a-140f, launch the drone 110 in response to the trigger event 142, wait a predetermined time (e.g., 2 seconds to 20 second) after the trigger event 142, and retract the drone 110 in response to the subsequent event 144 being undetected within the predetermined time after the trigger event 142. If the subsequent event is detected by the system 100 within the predetermined time after the trigger event 142, the system 100 places the drone 110 in the alert configuration. The drone 110 subsequently flies to the initial location 98 and generates one or more alert notifications. The system 100 (e.g., the telematics cellular network node 152 and/or the drone 110) may also attempt to call for assistance via the cellular network 76.

The drone 110 implements a smart drone. The drone 110 is operational to depart from the storage system 120, fly to various locations, return to the storage system 120, recharge while in the storage system 120, and generate and present one or more of the alert notifications 114 while deployed in the air. The drone 110 is configured to communicate via the cellular network 76. The drone 110 is also configured to communicate with the telematics unit 150 in the vehicle 90 via the drone commands 156.

The storage system 120 is operational to hold, recharge, release, capture, and protect the drone 110. While the drone 110 is in a retracted configuration, the storage system 120 covers and protects the drone 110 from the elements (e.g., wind, rain, hail, sand, and the like) in the environment 70. While the drone is being launched, the storage system 120 uncovers the drone 110 to allow the drone clear access to the environment 70.

The tether 130 implements a flexible cable that releasably holds the drone 110 to the storage system 120. The tether 130 generally has a fixed length that limits flights of the drone 110 to within a horizontal range from and a limited height above the vehicle 90. When the drone 110 is released from the tether 130, the drone is free to fly beyond the horizontal/vertical range limits imposed by the tether 130. In various embodiments, the tether 130 may include a "spare" section that increases the length of the range limit.

The electronic units 140a-140f implement a variety of circuits within the system 100. The circuits may include, but are not limited to, an airbag controller, a supplemental restraint system, a stability control unit, an anti-lock braking system, a battery temperature monitor, and a theft alarm. Other control units may be implemented to meet a design criteria of a particular application. The electronic units 140a-140f are operational to generate the trigger event 142 and generate the subsequent event 144 based on various events experienced by and/or within the vehicle 90. The electronic units 140a-140f may present the trigger event 142 and the subsequent event 144 to the telematics unit 150 via the communication bus 160.

The telematics unit 150 implements one or more processors, one or more non-transitory computer readable storage devices, and one or more memory devices. The telematics unit 150 is operational to launch the drone 110 in response to a trigger event 142, wait the predetermined time after the trigger event 142, retract the drone 110 in response to the subsequent event 144 being undetected within the predetermined time after the trigger event 142, and place the drone 110 in the alert configuration in response to detecting the subsequent event 144 within the predetermined time after the trigger event 142. In addition to deploying the drone 110, the telematics unit 150 may request assistance via the cellular network 76, where available at the current location 96.

The communication bus 160 implement a bidirectional digital bus. The communication bus 160 is operational to exchange data among the storage system 120, the electronic units 140a-140f, the telematics unit 150 and the user control 180.

The battery 170 implements one or more battery cells, battery modules, and/or battery packs. The battery 170 is operational to store electrical energy and present electrical power to the electronics in the vehicle 90. In various embodiments, the battery 170 may be subject to a thermal runaway condition that may damage the battery 170. In various embodiments, the battery 170 may be a low-voltage battery (e.g., 12 volts DC). In other embodiments, the battery 170 may be a high-voltage battery (e.g., 400 volts DC). Other battery arrangements and/or voltages may be implemented to meet a design criteria of a particular application.

Figure 2:
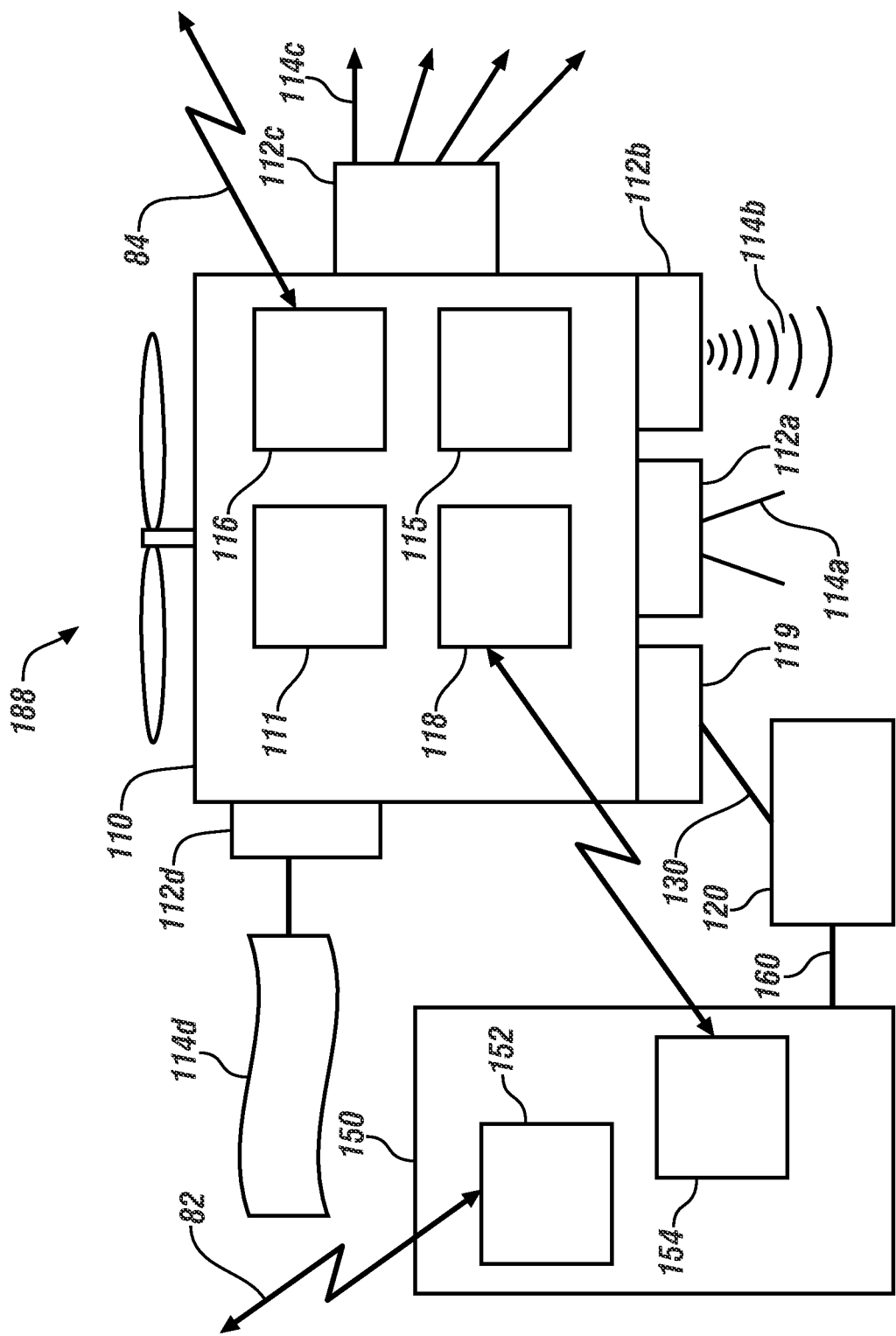
FIG. 2 is a schematic diagram of a drone and a telematics unit in accordance with one or more exemplary embodiments.

Referring to FIG. 2, a schematic diagram of an example implementation of a drone 110 and a telematics unit 150 is shown in accordance with one or more exemplary embodiments. The example illustrates the drone 110 in flight in the alert configuration 188 and attached to the storage system 120 with the tether 130 (e.g., a tethered configuration).

The drone 110 may include a drone controller 111, multiple notification actuators 112 that generate multiple alert notifications 114, a drone cellular network node 116, a drone transceiver 118, and a tether coupler 119. The drone controller 111 is coupled to the notification actuators 112, a Global Positioning System (GPS) receiver 115, the drone cellular network node 116, the drone transceiver 118 and the tether coupler 119. The telematics unit 150 includes a telematics cellular network node 152 and a vehicle transceiver 154.

The drone controller 111 implements one or more processors, one or more non-transitory computer readable storage devices, and one or more memory devices. The drone controller 111 is operational to control flight of the drone 110 based on commands received from the telematics unit 150. In various situations, the drone controller 111 may fly the drone 110 independent of the telematics unit 150 by executing one or more "Lassie" routines. In one of the "Lassie" routines, the drone controller 111 may fly the drone 110 in a substantially straight path along a given direction while seeking a connection via the cellular network 76. If a cellular connection is established, the drone controller 111 may request assistance for the vehicle 90 and provide relevant details, such as the current location, time of the initial event, and a picture of the area surrounding the vehicle 90. In another "Lassie" routine, the drone controller 111 may fly the drone 110 along a roadway in the given direction. While flying, the drone controller 111 may gather data that is used to recognize potential assistance vehicles 80. If a potential assistance vehicle 80 is found, the drone controller 111 attempts to communicate with the potential assistance vehicle 80. If the potential assistance vehicle 80 responds, the drone controller 111 may fly the drone 110 along the roadway 74 back to the current location 96 to guide the potential assistance vehicle 80 to the vehicle 90.

The notification actuators 112 implement multiple actuators configured to present information into the surrounding environment 70 and via the cellular network 76. The notification actuators 112 may include, but are not limited to, a camera 112a, a speaker 112b, one or more lights 112c, and a banner actuator 112d. Other types of actuators may be implemented to meet a design criteria of a particular application.

The camera 112a is operational to capture and record images and optionally video (e.g., image notifications 114a) as seen from a point of view of the drone 110. The images and/or video may be transferred via the cellular network 76 to an assistor 78.

The speaker 112b implements a loudspeaker. The speaker 112b is utilized to broadcast audio notifications 114b around the drone 110. The audio notifications 114b generally alert anyone approaching the drone 110 to be cautious of the conditions near the drone 110.

The lights 112c implement lightbulbs and/or displays. The lights 112c are utilized to broadcast visual notifications 114c around the drone 110. The visual notifications 114c generally alert anyone approaching the drone 110 to be cautious of the conditions near the drone 110.

The banner actuator 112d implements one or more motors operational to deploy and retract a banner 114d. The banner 114d may contain a message that alerts anyone approaching the drone 110 to be cautious of the conditions on the ground 72 below the drone 110.

The GPS receiver 115 implements a satellite-based positioning receiver. The GPS receiver 115 is operational to determine a spatial position and a local time for the drone 110 based on satellites orbiting the Earth. The spatial position and local time may be presented to the drone controller 111.

The drone cellular network node 116 implements a transceiver operational to communicate digital messages on the cellular network 76 via the drone cellular data 84. The drone cellular network node 116 is configured to send a message to an assistor 78.

The drone transceiver 118 implements a radio-frequency transmitter and receiver. The drone transceiver 118 is operational to provide bidirectional communications with the vehicle transceiver 154 via a signal that carries the drone commands 156. The bidirectional communications enables the drone controller 111 to exchange data and commands with the telematics unit 150.

The tether coupler 119 implements a controlled latch. The tether coupler 119 is configured to latch the drone 110 to the tether 130 in a local mode. The tether coupler 119 is configured to unlatch the drone 110 from the tether 130 in a remote mode. With the drone 110 unlatched from the tether 130, the drone 110 is free to fly further away from the vehicle 90 than the tether 130 permits.

The telematics cellular network node 152 implements a transceiver operational to communicate digital messages on the cellular network 76. The telematics cellular network node 152 is configured to send a message via the vehicle cellular data 82 to an assistor 78. In various embodiments, the telematics cellular network node 152 implements vehicle-to-everything (V2X) communications via the cellular network 76 and/or a wireless local area network (WLAN).

The vehicle transceiver 154 implements a radio-frequency transmitter and receiver. The vehicle transceiver 154 is operational to provide bidirectional communications with the drone transceiver 118. The bidirectional communications enable the drone controller 111 to exchange data and commands with the telematics unit 150.

Figure 4:
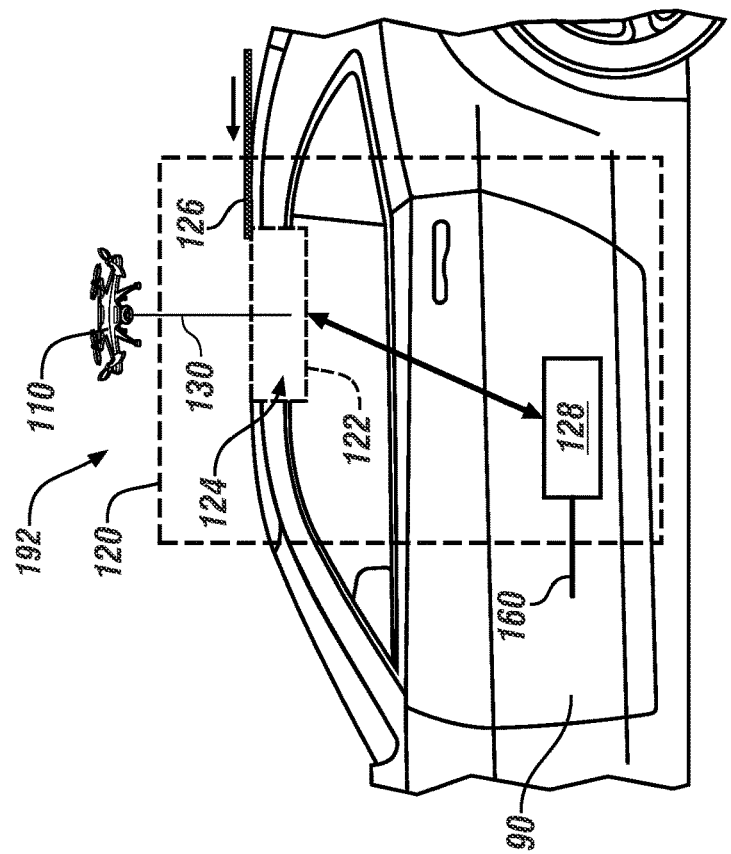
FIG. 4 is a schematic partially-exposed diagram of the drone in a launched configuration in accordance with one or more exemplary embodiments.
Figure 3:
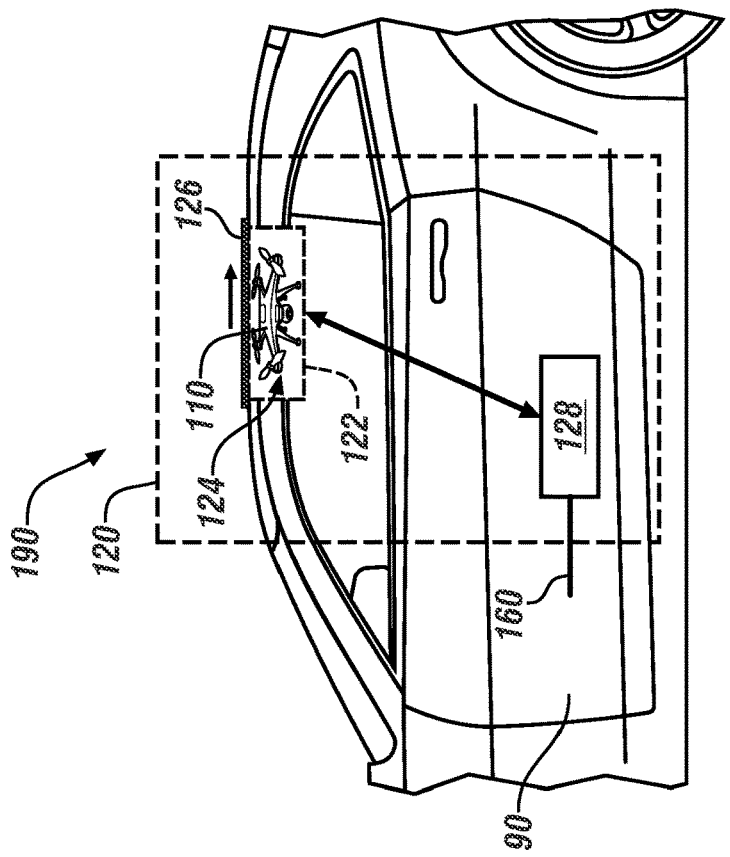
FIG. 3 is a schematic partially-exposed diagram of the drone in a retracted configuration is shown in accordance with one or more exemplary embodiments.

Referring to FIGS. 3 and 4, schematic partially-exposed diagrams of an example of the drone 110 in a retracted configuration 190 and a launched configuration 192 are shown in accordance with one or more exemplary embodiments. The storage system 120 is generally disposed along a top surface of the vehicle 90. The storage system 120 includes a storage member 122 the defines a storage volume 124, a cover member 126, and a storage controller 128.

The storage volume 124 of the storage member 122 is configured to store, protect, and retain the drone 110 while in the retracted configuration 190. In the example, the storage member 122 is enclosed within a roof of the vehicle 90. The cover member 126 is slidably coupled to the vehicle 90. In the retracted configuration 190 (FIG. 3), the cover member 126 overlaps and covers the storage volume 124. In the launched configuration 192 (FIG. 4), the cover member 126 is displaced from the storage volume 124 and the drone 110 flies out of the storage member 122 drawing the tether 130 along. Actuation of the cover member 126 slides the cover member 126 forward and backward longitudinally along the roof of the vehicle 90, or within a channel or other opening formed in the roof of the vehicle 90. In various embodiments, the storage controller 128 is in communication with an actuator coupled to the cover member 126 to control and actuate the motion of the cover member 126. The storage controller 128 is also in communication with the telematics unit 150 (FIG. 1) via the communication bus 160.

Figure 5:
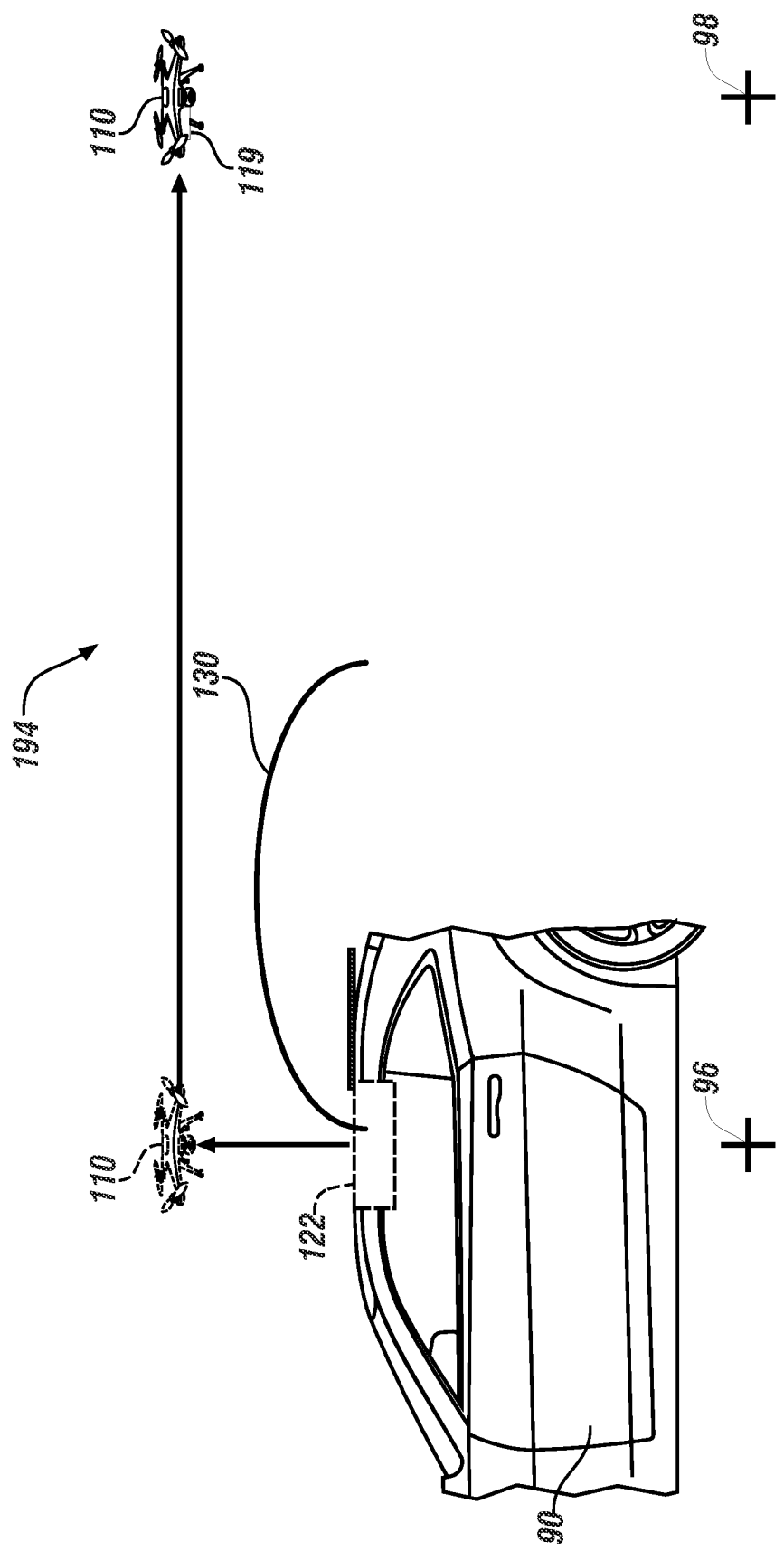
FIG. 5 is a schematic diagram of the drone in a free-flight configuration in accordance with one or more exemplary embodiments.

Referring to FIG. 5, a schematic diagram of an example of the drone 110 in a free-flight configuration 194 is shown in accordance with one or more exemplary embodiments. In the free-flight configuration 194, the tether coupler 119 releases the tether 130, and the drone 110 is able to fly under control from the vehicle 90 and/or under self-control.

In situations where the current location 96 of the vehicle is close to the initial location 98 where the trigger event occurred, the drone 110 may fly from the vehicle 90 at the current location 96 to the initial location 98 while attached to the tether 130. In other situations (as illustrated), a distance between the current location 96 and the initial location 98 may exceed a length of the tether 130. In such situations, the drone 110 receives the coordinates of the initial location 98 from the telematics unit 150, flies out of the storage member 122, releases the tether 130, and subsequently flies to the initial location 98 in the free-flight configuration 194 under the guidance of the GPS receiver 115 (FIG. 2).

Figure 6:
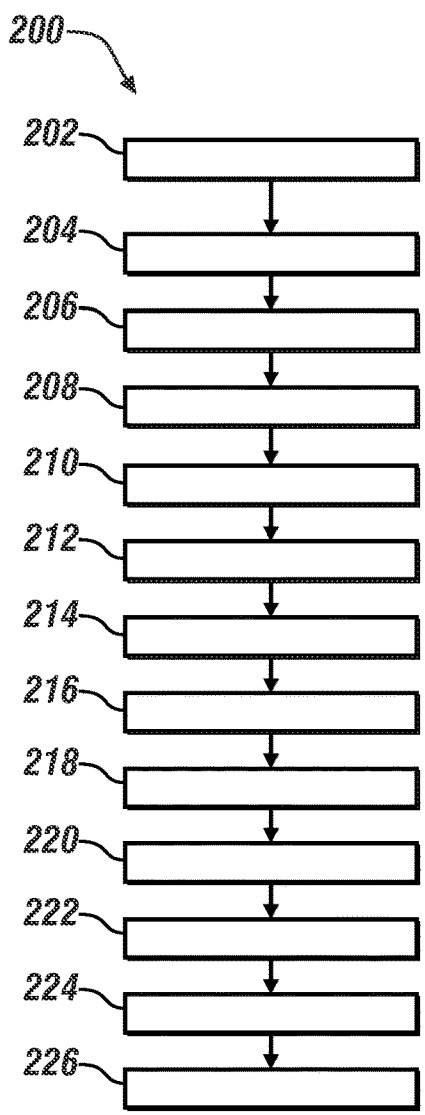
FIG. 6 is a flow diagram of a method for aerial-based event notification in accordance with one or more exemplary embodiments.

Referring to FIG. 6, a flow diagram of an example method 200 for aerial-based event notification is shown in accordance with one or more exemplary embodiments. The method 200 (or process) is implemented by the system 100. The method 200 generally includes steps 202 to 226, as illustrated. The sequence of steps is shown as a representative example. Other step orders may be implemented to meet the criteria of a particular application.

In the step 202, the electronic units 140a-140f detect a trigger event 142 and notify the telematics unit 150. The trigger event may be one or more of an anti-lock braking event, a wheel slippage event, a near roll-over event, an airbag deployment event, a supplemental restraint system activation event, a high thermal temperature event in the battery 170, a theft alarm event, and the like. The telematics unit 150 responds to the trigger event 142 in the step 204 by recording an initial time of the trigger event 142. In the step 206, telematics unit 150 also records the initial location 98 of the system 100 (the vehicle 90) when the trigger event 142 is received. The telematics unit 150 launches the drone 110 in the step 208. Launching the drone 110 includes powering up the drone 110, opening the cover member 126 of the storage system 120, releasing the drone 110, and commanding the drone 110 to fly.

In the step 210, the telematics unit 150 waits a predetermined time after reception of the trigger event 142 to determine if the trigger event 142 was a false alarm, or the trigger event 142 foreshadows a situation that should be addressed. If the telematics unit 150 does not receive the subsequent event 144 within the predetermined time, the telematics unit 150 places the drone 110 in the retracted configuration 190 in the step 212. Placing the drone 110 in the retracted configuration 190 includes recalling the drone 110, securing the drone 110 in the storage member 122, closing the cover member 126, and powering down the drone 110.

In various situations, the electronic units 140a-140f may detect and signal a subsequent event 144 within the predetermined time and/or the driver 92 may activate a manual request for assistance through the user controls 180 at the step 214. The subsequent event 144 and/or manual request are transferred to the telematics unit 150 as part of the step 214. In the step 216, the telematics unit 150 records the current location 96 in response to the subsequent event 144 and/or manual request. The telematics unit 150 may also freeze a 360 degree camera video data buffer, activate a driver monitoring system and/or a cabin monitor, if equipped, in the step 216. In the step 218, the telematics unit 150 transfers the initial time, the initial location 98 and the current location 96 to the drone 110 via the drone commands 156.

Next, the telematics unit 150 commands the storage system 120 to unlock the drone 110 in the step 220. In the step 222, the drone 110 is commanded into the alert configuration 188 (FIG. 2). The drone 110 flies above the current location 96, takes a wide-angle picture of the scene around the vehicle 90, and then flies to the initial location 98 in the step 224. If the initial location 98 is sufficiently close to the vehicle 90, the tether 130 may remain attached to the drone 110. Otherwise, the tether 130 is detached from the drone 110. In the step 226, the drone 110 generates one or more alert notifications 114 from the notification actuators 112 while the drone 110 is proximate the initial location 98 (e.g., within a radius of approximately 0.1 meters to 5 meters).

Figure 7:
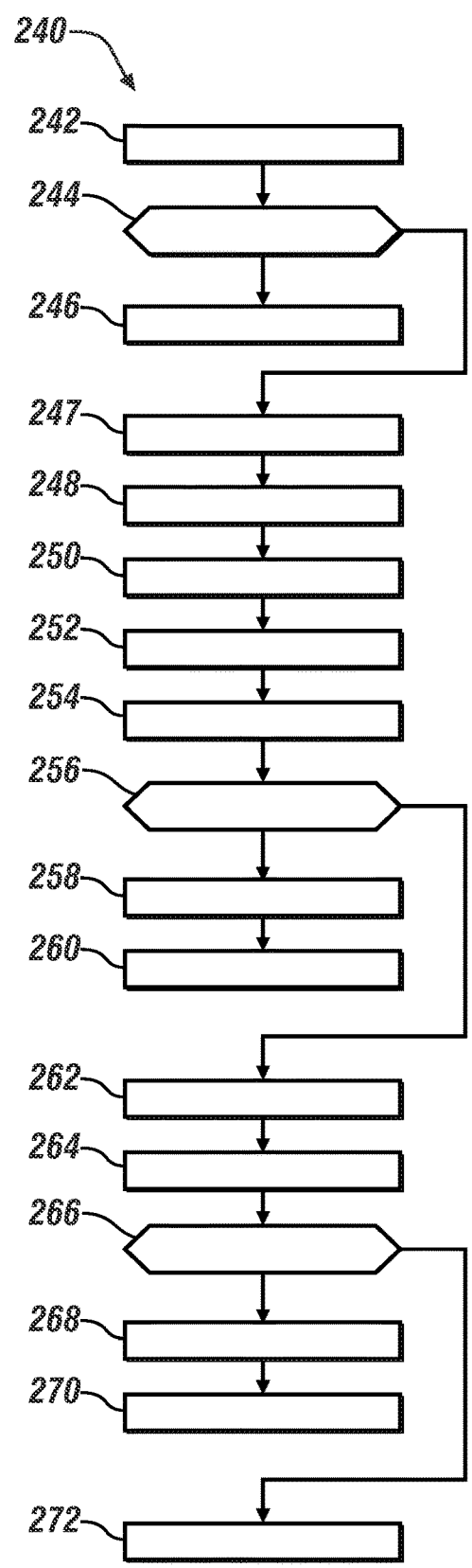
FIG. 7 is a flow diagram of a method for requesting assistance in accordance with one or more exemplary embodiments.

Referring to FIG. 7, a flow diagram of an example method 240 for requesting assistance is shown in accordance with one or more exemplary embodiments. The method 240 (or process) is implemented by the system 100. The method 200 generally includes steps 242 to 272, as illustrated. The sequence of steps is shown as a representative example. Other step orders may be implemented to meet the criteria of a particular application.

In the step 242, the telematics unit 150 makes a request for assistance via the cellular network 76 in response to the subsequent event 144 occurring within the predetermined time after the trigger event 142 (FIG. 1). A check is performed in the step 244 to determine if contact has been made with some form of assistance. If contact is made, the telematics unit 150 sends the current location 96 of the vehicle 90 to the assistor 78 in the step 246. If no contact is made or the telematics unit 150 cannot connect to the cellular network 76, the telematics unit 150 reverts to the drone 110 for help in the step 247.

In the step 248, the horizontal range of the drone 110 from the system 100 is initially limited by the length of the tether 130. If the drone 110 cannot reach the initial location 98 due to the tether 130, the drone 110 is released from the tether 130 in the step 250. Thereafter, the drone 110 flies to the initial location 98 in the step 252.

In the step 254, the drone 110 seeks a connection on the cellular network 76 as the telematics unit 150 was unable to connect to the cellular network 76 or unable to contact an assistor 78. A check is performed in the step 256 to determine if contact has been made with some form of assistance. If contact is made, the drone 110 sends the current location 96 of the vehicle 90, a picture of a scene around the vehicle 90 taken by the drone 110 from above the current location 96, and the initial time of the trigger event 142 to the assistor 78 in the step 258. The vehicle 90 is notified of the success in the step 260.

If no contact is made or the drone 110 cannot connect to the cellular network 76, the drone 110 may increase a height above the ground 72 in the step 262. From the higher altitude, the drone 110 may re-seek establishing a connection on the cellular network 76 and contacting assistance in the step 264. Another check is performed in the step 266 to determine if assistance has been contacted from the higher altitude. If an assistor 78 is reached, the drone 110 transmits via the cellular network 76 the current location 96 of the vehicle 90, a picture of a scene around the vehicle 90 taken by the drone 110 hovering above the current location 96, and/or the initial time of the trigger event 142 in the step 268. In the step 270, the drone 110 notifies the vehicle 90 that the assistor 78 has been notified. If the drone 110 still cannot contact assistance at the higher altitude per the check in step 266, the drone 110 notifies the vehicle 90 of the lack of contact in the step 272.

Figure 8:
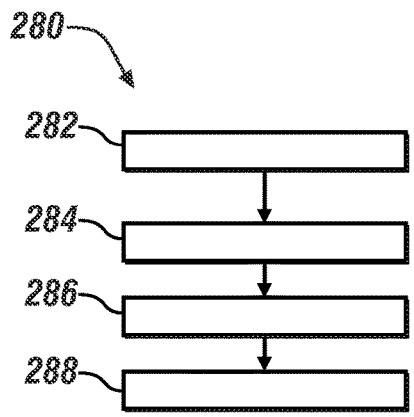
FIG. 8 is a flow diagram of a method for seeking distant assistance in accordance with one or more exemplary embodiments.

Referring to FIG. 8, a flow diagram of an example method 280 for seeking distant assistance is shown in accordance with one or more exemplary embodiments. The method (or process) 280 may be performed by the system 100. The method 280 generally includes steps 282 to 288, as illustrated. The sequence of steps is shown as a representative example. Other step orders may be implemented to meet the criteria of a particular application.

In the step 282, the telematics unit 150 may determine a calculated direction to find assistance based on one or more maps that identify the locations of cellular towers proximate the current location 96 and one or more towns proximate the current location 96. In various embodiments, the telematics unit 150 may generate the calculated direction based on a nearest cell tower or a nearest town. In the step 284, the telematics unit 150 transfers the calculated direction to the drone 110. The drone 110 is released from the tether 130 in the step 286. In the step 288, the drone 110 flies generally in the calculated direction.

Figure 9:
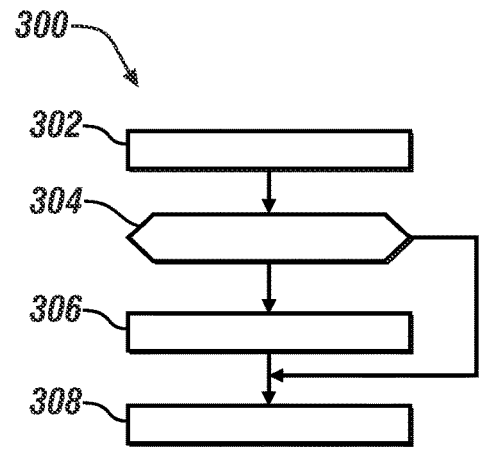
FIG. 9 is a flow diagram of a method for a straight-path search in accordance with one or more exemplary embodiments.

Referring to FIG. 9, a flow diagram of an example method 300 for a straight-path search is shown in accordance with one or more exemplary embodiments. The method (or process) 300 may be performed by the system 100. The method 300 generally begins once the drone 110 is flying in the calculated direction per the step 288 in FIG. 8. The method 300 generally includes steps 302 to 308, as illustrated. The sequence of steps is shown as a representative example. Other step orders may be implemented to meet the criteria of a particular application.

In the step 302, the drone 110 seeks a connection on the cellular network 76 while flying an approximately straight path in the calculated direction. A check is performed at the step 304 to determine if an assistor 78 has been contacted. If yes, the drone 110 transmits via the cellular network 76 one or more of the current location of the system, a picture of a scene around the vehicle 90 taken by the drone 110 hovering above the current location 96, and the initial time of the trigger event 142 in response to the connection being established to the assistor 78 in the step 306. The drone 110 subsequently returns to the vehicle 90 in the step 308. If no connection is made to the cellular network 76 and no assistance has been reached in the step 304, and the drone 110 is running low on power, the drone 110 may return to the vehicle 90 in the step 308 to recharge. Otherwise, the drone 110 continues to seek assistance in the calculate direction.

Figure 10:
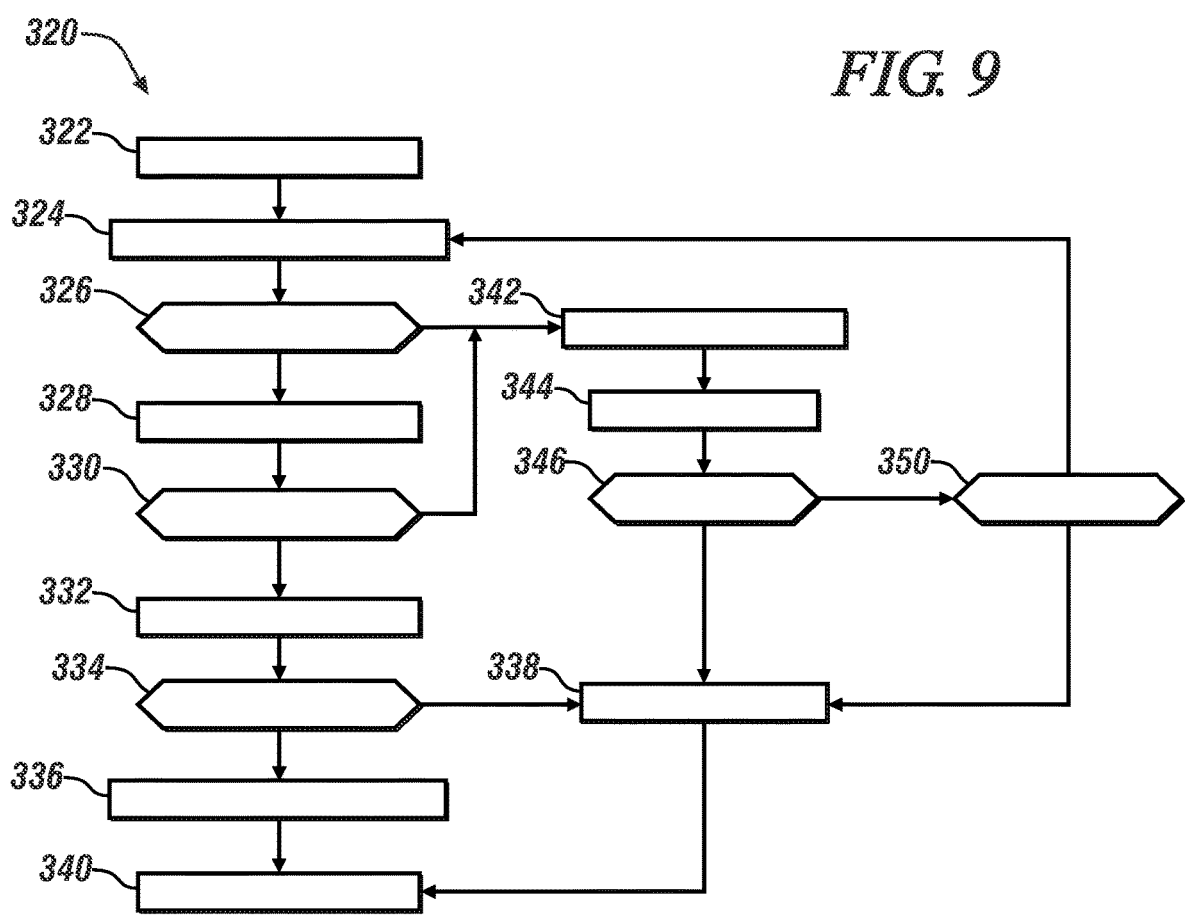
FIG. 10 is a flow diagram of a method for a road-following search in accordance with one or more exemplary embodiments.

Referring to FIG. 10, a flow diagram of an example method 320 for a road-following search is shown in accordance with one or more exemplary embodiments. The method (or process) 320 may be performed by the system 100. The method 320 generally begins once the drone 110 is flying in the calculated direction per the step 288 in FIG. 8. The method 320 generally includes steps 322 to 350, as illustrated. The sequence of steps is shown as a representative example. Other step orders may be implemented to meet the criteria of a particular application.

In the step 322, the drone 110 flies along a road (e.g., possibly the roadway 74) running in approximately the calculated direction. While flying, the drone 110 seeks a potential assistance vehicle 80 on the road in the step 324 using the camera 112a. The potential assistance vehicle 80 may be optically identified by markings and/or flashing lights. A check is performed in the step 326 to determine if the drone 110 has found an assistant vehicle 80. If not, the drone 110 continues to follow the road in the step 342. If a potential assistance vehicle 80 is found, the drone 110 may display a visual notification 114c and/or an audio notification 114b to gain the attention of occupants in the potential assistance vehicle 80 in the step 328. For example, the visual notification 114c and/or an audio notification 114b may display and/or speak, "Will you please follow me to provide aid to another vehicle? Please flash your lights twice if yes."

A check is performed in the step 330 to decide how the potential assistance vehicle 80 responds. If the drone 110 detects a "yes" acknowledgement from the potential assistance vehicle 80 in the step 330, the drone 110 may begin to fly along the road back to the current location 96 of the vehicle 90 in the step 332. A check may be performed in the step 334 to determine if the potential assistance vehicle 80 is actually following. If the potential assistance vehicle 80 is following, the drone 110 may continue using the reverse route along the road back to the current location 96 in the step 336. The potential assistance vehicle 80 generally follows the drone 110 back to the vehicle 90. If the drone 110 does not detect the potential assistance vehicle 80 following in the step 334, the drone 110 may change course and fly along a generally straight path back to the current location 96 of the vehicle 90 in the step 338. Once the drone 110 has reached the vehicle 90, the drone 110 docks with the vehicle 90 in the step 340 and begin recharging.

If the drone 110 does not detect that the potential assistance vehicle 80 flashed the headlights twice in the step 330, the drone 110 may change one or more of the notification actuators 112 to aid in obtaining assistance and continue traveling along the road in the step 342 seeking another potential assistance vehicle 80. While the drone 110 is following the road, the drone 110 may continue attempts to connect to the cellular network 76 and send a call for help in the step 344. Where the drone 110 has reached a point where there is just sufficient power to return to the vehicle 90, the drone 110 changes course in the step 346 and flies straight back to the vehicle 90 in the step 338. In the step 350, the drone 110 may successfully connect to the cellular network 76, transmit the relevant information to an assistor 78, and request aid be sent to the vehicle 90. Thereafter the drone 110 changes course in the step 346 and flies straight back to the vehicle 90 per the step 338.

Figure 11:
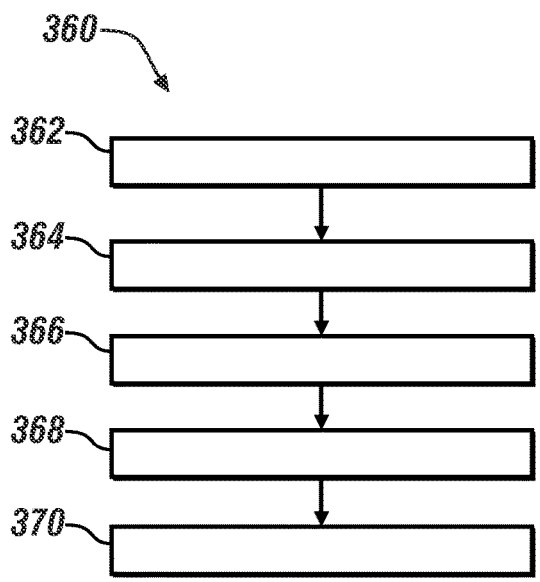
FIG. 11 is a flow diagram of a method for a manual search in accordance with one or more exemplary embodiments.

Referring to FIG. 11, a flow diagram of an example method 360 for a manual search is shown in accordance with one or more exemplary embodiments. The method (or process) 360 may be performed by the system 100. The method 360 generally includes steps 362 to 370, as illustrated. The sequence of steps is shown as a representative example. Other step orders may be implemented to meet the criteria of a particular application.

In the step 362, the telematics unit 150 receives a manual direction from the user controls 180. Where the drone 110 is intended to fly beyond the reach of the tether 130, the telematics unit 150 receives a release drone command from the user controls 180 in the step 364. The telematics unit 150 relays the release drone command to the drone 110, and the tether coupler 119 releases the drone 110 from the tether 130 in the step 366. The telematics unit 150 also transfers the manual direction to the drone 110 in the step 368. In the step 370, the drone 110 flies in the manual direction while activating the notification actuators 112 and attempting to contact an assistor 78 via the cellular network 76.

Figure 12:
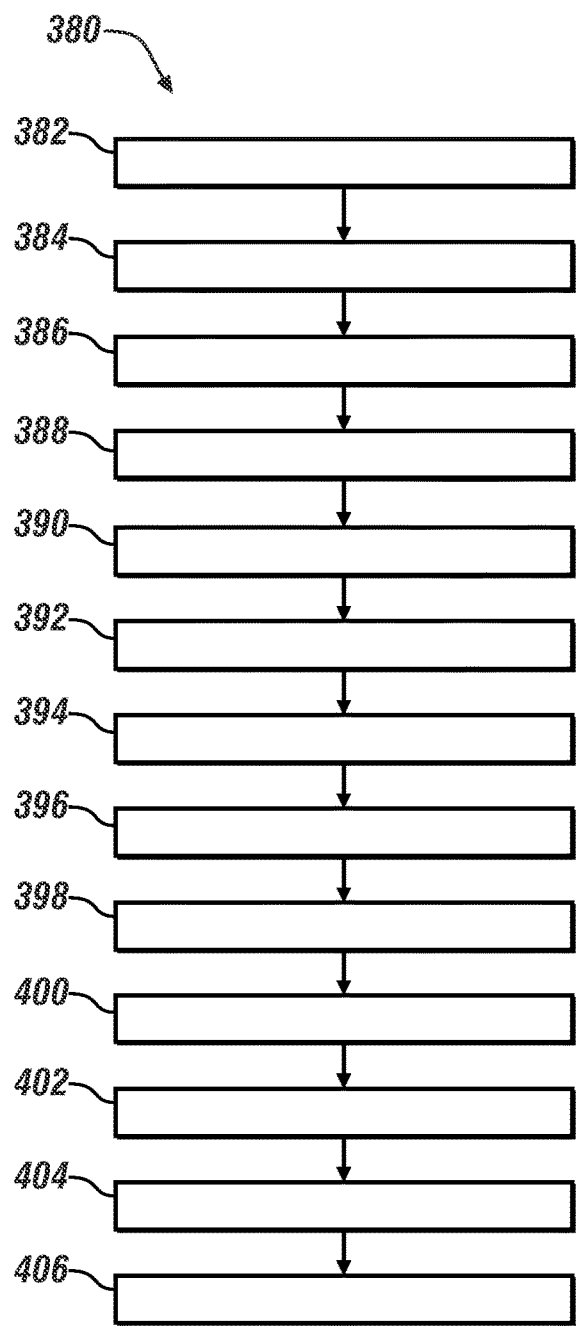
FIG. 12 is a flow diagram of a method for trigger event assertions and subsequent event assertions in accordance with one or more exemplary embodiments.

Referring to FIG. 12, a flow diagram of an example method 380 for trigger event assertions and subsequent event assertions is shown in accordance with one or more exemplary embodiments. The method (or process) 380 may be performed by the system 100. The method 380 generally includes steps 382 to 406, as illustrated. The sequence of steps is shown as a representative example. Other step orders may be implemented to meet the criteria of a particular application.

In the step 382, the airbag controller 140a measures an acceleration or a deceleration of the system 100. The airbag controller 140a asserts the trigger event 142 in the step 384 in response to the acceleration or the deceleration exceeding a threshold acceleration value or a threshold deceleration value, respectively.

In the step 386, the stability control unit 140c continuously measures an attitude (e.g., a roll-over index) of the system. The attitude is generally an orientation of the system 100 determined by the relationship between axes of the system 100 and a reference datum, such as the ground 72. The stability control unit 140c asserts the trigger event 142 in the step 388 in response to the attitude (e.g., the roll-over index) exceeding a threshold index value.

In the step 390, the anti-lock braking system 140d continuously monitors the brakes 172. Where one or more of the brakes 172 experiences a slippage, the anti-lock braking system 140d asserts the trigger event 142 in the step 392.

The battery temperature monitor 140e continuously measures a temperature of the battery 170 in the step 394. In the step 396, the battery temperature monitor 140e may assert the trigger event 142 in response to the temperature exceeding a threshold temperature value. In the step 398 the battery temperature monitor 140e may indicate that the subsequent event 144 has taken place in response to the battery temperature indicating a thermal runaway condition.

In the step 400, the theft alarm 140f may assert the trigger event 142 in response to a theft attempt being sensed. Where the theft alarm remains triggered during the predetermined period, the theft alarm 140f may notify the telematics unit 150 that the subsequent event 144 has taken place in the step 402.

In the step 404, the supplemental restraint system 140b may notify the telematics unit 150 of the trigger event 142 in response to detecting an issue with the vehicle 90. The supplemental restraint system 140b may assert the subsequent event 144 in the step 406 where the issue remains active during the predetermined time.

One or more embodiments of the system 100 incorporates a smart drone 110 packaged in a vehicle 90. The drone 110 is automatically prepared for and launched in response to one or more trigger events 142. The launching of the drone 110 does not cause the drone 110 to send visible and/or audible alert signals. If a trigger event 142 is followed by a subsequent event 144 within a predetermined time, the drone 110 is automatically placed in an alert configuration. The alert-configured drone 110 hovers above the vehicle 90, takes a picture of the vehicle 90 and the surrounding scene, and sends out visible and/or audible alert signals proximate the vehicle 90 to alert others approaching the location of the vehicle 90. The picture of vehicle 90 and the current location 96 of the vehicle 90 may be sent to an assistor 78. If the subsequent event 144 is not sensed within the predetermined time, the drone 110 may be retracted.

The drone 110 may operate in one or more of multiple (e.g., four) modes. In particular the drone 110 may operate in a normal mode, a notification/seek help mode (e.g., the alert configuration), a self-diagnosis mode, and a battery charging mode. The self-diagnostics mode is enabled after the vehicle 90 has traveled at least a predetermined distance (e.g., >500 miles) since a previous self-test, the engine state is from key-on to key-off, and the vehicle 90 is standing still. In the self-diagnostics mode, the drone 110 is deployed and stays a close distance (e.g., <one meter) from the vehicle 90. The drone 110 subsequently enables a vehicle-to-everything channel and broadcasts a message containing the location of the vehicle 90 for a short time (e.g., about one minute). If feedback for the broadcast is "passed," the next odometer distance for the next self-diagnostics is calculated and recorded. If feedback from broadcast is a failure, a diagnostics trouble code is set. After the test time has expired, the drone 110 returns to the vehicle 90 and resumes operations in the normal mode.

The battery charging mode is enabled while the engine state is key-off, the vehicle 90 is stationary, the drone battery level is less than a recharging threshold level, and the drone 110 is secured in the storage system 120. In the battery charging mode, the battery of the drone 110 is charged until reaching a charged threshold level.

Positioning the drone 110 above the current location 96 of the vehicle 90 generally helps others locate the vehicle 90 where visibility is poor, such as in bad weather, hilly conditions, heavy vegetation, etc. The drone 110 may also send Morse Code messages (e.g., S.O.S.) with the lights 112c and/or the speakers 112b that is useful in the low visibility conditions.

In poor cellular signal areas, the drone 110 may utilize a reserved tether length or release from the tether 130 and fly to a higher altitude in an attempt to acquire a better signal. In cases where no cellular signal is available, the drone 110 may untether and move along the road to the initial location 98 where the trigger event 142 took place, or further back along the road to warn other vehicles.

Where the vehicle 90 cannot determine the current location 96, the drone 110 may be flown upward and provide video of the surrounding area back to the vehicle 90. The vehicle 90 uses the video to map match the current location 96 to an on-vehicle database (e.g., compare topography to satellite images, look for street signs, etc.).

The system 100 generally provides an aerial-based event notification operation and/or assistance seeking capability for a vehicle 90. The system 100 includes a telematics unit 150, a drone 110 having one or more notification actuators 112, and a tether 130 that connects the drone 110 to the system 100. The system 100 is operational to detect a trigger event 142, launch the drone 110 in response to the trigger event 142, wait a predetermined time after the trigger event 142, and retract the drone 110 in response to a subsequent event 144 being undetected within the predetermined time after the trigger event. Where the system 100 detects the subsequent event 144 within the predetermined time after the trigger event 142, the system 100 commands the drone 110 into an alert configuration. The drone 110 subsequently generates one or more alert notifications 114 from the one or more notification actuators 112 while in the alert configuration.

Numerical values of parameters (e.g., of quantities or conditions) in this specification, including the appended claims, are to be understood as being modified in instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A method for aerial-based event notification comprising:
    detecting a trigger event with one or more electronic units of a system, wherein the system includes a telematics unit, a drone having one or more notification actuators, and a tether that connects the drone to the system;
    launching the drone with the telematics unit in response to the trigger event;
    waiting a predetermined time after the trigger event;
    retracting the drone in response to a subsequent event being undetected within the predetermined time after the trigger event;
    detecting the subsequent event with the one or more electronic units;
    placing the drone in an alert configuration in response to detecting the subsequent event within the predetermined time after the trigger event; and
    generating one or more alert notifications from the one or more notification actuators while the drone is in the alert configuration.

2. The method according to claim 1, further comprising:
    recording an initial time of the trigger event;
    recording an initial location of the system in response to the trigger event;
    recording a current location of the system in response to the subsequent event;
    transferring the initial time, the initial location and the current location to the drone; and
    flying the drone to the initial location, wherein the one or more alert notifications are generated at the initial location.

3. The method according to claim 2, further comprising:
    requesting an assistance via a cellular network with the telematics unit in response to the detecting of the subsequent event within the predetermined time after the trigger event;
    seeking a connection on the cellular network with the drone in response to the telematics unit being unable to connect to the cellular network; and
    transmitting from the drone via the cellular network one or more of the current location of the system, a picture of a scene around the system taken by the drone hovering above the current location, and the initial time of the trigger event in response to the connection being established by the drone.

4. The method according to claim 3, further comprising:
    releasing the drone from the tether in response to the drone being unable to connect to the cellular network;
    increasing a height of the drone; and
    re-seeking the connection on the cellular network.

5. The method according to claim 3, further comprising:
    determining a calculated direction to find the assistance with the telematics unit based on one or more maps of a plurality of cellular towers proximate the current location and a plurality of towns proximate the current location;
    transferring the calculated direction to the drone;
    releasing the drone from the tether; and
    flying the drone in the calculated direction.

6. The method according to claim 5, further comprising:
    seeking a connection on the cellular network with the drone while flying an approximately straight path in the calculated direction; and
    transmitting from the drone via the cellular network one or more of the current location of the system, a picture of a scene around the system taken by the drone hovering above the current location, and an initial time of the trigger event in response to the connection being established by the drone.

7. The method according to claim 5, further comprising:
    flying the drone along a road running in approximately the calculated direction;
    seeking an assistance vehicle on the road with the drone; and
    displaying one or more of a visual notification and an audio notification from the drone to the assistance vehicle in response to the drone finding the assistance vehicle.

8. The method according to claim 7, further comprising:
    receiving at the drone an acknowledgement from the assistance vehicle that at least one of the visual notification and the audio notification was received; and
    flying the drone along the road back to the current location in response to the acknowledgement.

9. The method according to claim 2, further comprising:
    requesting an assistance via a cellular network with the telematics unit in response to the deploying of the drone;
    limiting a horizontal range of the drone from the system with the tether; and releasing the drone from the tether in response to the initial location being further than the horizontal range and the telematics unit being unable to connect to the cellular network.

10. The method according to claim 1, further comprising:
receiving a manual direction from a user control;
transferring the manual direction to the drone; and
flying the drone in the manual direction.

11. The method according to claim 1, further comprising:
measuring an acceleration of the system; and
asserting the trigger event in response to the acceleration exceeding a threshold acceleration value.

12. The method according to claim 1, further comprising:
measuring a roll-over index of the system; and
asserting the trigger event in response to the roll-over index exceeding a threshold index value.

13. The method according to claim 1, further comprising:
monitoring a plurality of brakes of the system; and
asserting the trigger event in response to one or more of the plurality of brakes indicating a slippage.

14. The method according to claim 1, further comprising:
measuring a temperature of a battery;
asserting the trigger event in response to the temperature exceeding a threshold temperature value; and
asserting the subsequent event in response to the temperature indicating a thermal runaway condition in the battery.

15. The method according to claim 1, further comprising:
asserting the trigger event in response to a theft alarm being triggered; and
asserting the subsequent event in response to the theft alarm remaining triggered during the predetermined time.

16. A system comprising:
a drone having one or more notification actuators, wherein the one or more notification actuators includes one or more of a speaker and a light;
a storage member configured to carry, deploy, and recover the drone;
one or more electronic units configured to detect a trigger event and a subsequent event in the system; and
a telematics unit in communication with the one or more electronic units and the drone, the telematics unit being configured to:
launch the drone configuration in response to the trigger event;
wait a predetermined time after the trigger event;
retract the drone into the storage member in response to the subsequent event being undetected within the predetermined time after the trigger event;
command the storage member to secure the drone after the drone is retracted into the storage member; and
place the drone in an alert configuration in response to detecting the subsequent event within the predetermined time after the trigger event;
wherein the drone is configured to generate one or more alert notifications from the one or more notification actuators while the drone is in the alert configuration, and the one or more alert notifications include one or more of an audio notification and a visual notification.

17. The system according to claim 16, wherein the one or more electronic units includes a stability control unit, an anti-lock braking system, a battery temperature monitor, a theft alarm, an airbag controller, and a supplemental restraint system.

18. The system according to claim 16, wherein:
the one or more notification actuators includes a banner actuator configured to alternatively deploy and retract a banner; and
the one or more alert notifications includes a caution message written on the banner.

19. A vehicle comprising:
a drone having one or more notification actuators, wherein the one or more notification actuators includes one or more of a speaker and a light;
a storage member configured to carry, deploy, and recover the drone;
a tether configured to releasably hold the drone to the storage member;
one or more electronic units configured to detect a trigger event and a subsequent event in the vehicle; and
a telematics unit in communication with the one or more electronic units, the drone, and the storage member, the telematics unit being configured to:
launch the drone in response to the trigger event;
wait a predetermined time after the trigger event;
retract the drone and the tether into the storage member in response to the subsequent event being undetected within the predetermined time after the trigger event;
command the storage member to secure the drone after the drone and the tether are retracted into the storage member; and
place the drone in an alert configuration in response to detecting the subsequent event within the predetermined time after the trigger event;
wherein the drone is configured to generate one or more alert notifications from the one or more notification actuators while the drone is in the alert configuration, and the one or more alert notifications include one or more of an audio notification and a visual notification.

20. The vehicle according to claim 19, further comprising:
an airbag controller configured to assert the subsequent event in response to deployment of one or more airbags.

* * * * *